(12) United States Patent
Gerber

(10) Patent No.: US 11,657,455 B2
(45) Date of Patent: *May 23, 2023

(54) SYSTEMS AND METHODS FOR MEASURING RELATIONSHIPS BETWEEN INVESTMENTS AND OTHER VARIABLES

(71) Applicant: Sander Gerber, New York, NY (US)

(72) Inventor: Sander Gerber, New York, NY (US)

(*) Notice: Subject to any disclaimer, the term of this patent is extended or adjusted under 35 U.S.C. 154(b) by 84 days.

This patent is subject to a terminal disclaimer.

(21) Appl. No.: 17/226,874

(22) Filed: Apr. 9, 2021

(65) Prior Publication Data

US 2021/0224916 A1 Jul. 22, 2021

Related U.S. Application Data

(63) Continuation of application No. 15/948,962, filed on Apr. 9, 2018, now Pat. No. 10,991,047, which is a continuation of application No. 14/015,257, filed on Aug. 30, 2013, now Pat. No. 9,940,673, which is a continuation-in-part of application No. 13/601,386, filed on Aug. 31, 2012, now Pat. No. 8,577,775, and a continuation-in-part of application No. 13/601,310, filed on Aug. 31, 2012, now Pat. No. 10,140,661.

(60) Provisional application No. 61/769,963, filed on Feb. 27, 2013.

(51) Int. Cl.
*G06Q 40/00* (2023.01)
*G06Q 40/06* (2012.01)

(52) U.S. Cl.
CPC .................. *G06Q 40/06* (2013.01)

(58) Field of Classification Search
None
See application file for complete search history.

(56) References Cited

U.S. PATENT DOCUMENTS

| | | |
|---|---|---|
| 6,003,018 A | 12/1999 | Michaud et al. |
| 6,564,191 B1 | 5/2003 | Reddy |
| 7,624,069 B2 | 11/2009 | Padgette |
| 7,904,368 B2 | 3/2011 | Weinstein et al. |
| 8,577,775 B1 | 11/2013 | Gerber |
| 8,903,733 B2 | 12/2014 | Mason |
| 9,940,673 B2 * | 4/2018 | Gerber .................. G06Q 40/06 |
| 10,991,047 B2 * | 4/2021 | Gerber .................. G06Q 40/06 |

(Continued)

OTHER PUBLICATIONS

Alloway, JPMorgan loss stokes risk model fears, Financial Times, May 13, 2012, 3 pages.
Anscombe's quartet, Wikipedia—the free encyclopedia, accessed on Aug. 28, 2012 from http://en.wikipedia.org/wiki/Anscombe%27s.sub.-quartet, 2 pages.

(Continued)

*Primary Examiner* — Olabode Akintola
(74) *Attorney, Agent, or Firm* — Foley & Lardner LLP

(57) ABSTRACT

The systems and methods described herein can identify meaningful relationships between variables, such as particular investments or general asset classes. Unlike conventional correlation analysis, these systems and methods provide an improved technique of comovement analysis that implements a threshold to eliminate data "noise" and then discretizes the remaining observations to normalize any outliers. Such comovement analysis has numerous advantages over known techniques for characterizing relationships between variables. In some embodiments, this improved comovement analysis can be used to calculate a covariance matrix for purposes of mean-variance optimized portfolio construction.

20 Claims, 6 Drawing Sheets

(56) References Cited

U.S. PATENT DOCUMENTS

| | | |
|---|---|---|
| 2002/0111891 A1 | 8/2002 | Hoffman et al. |
| 2002/0178096 A1 | 11/2002 | Marshall |
| 2003/0088492 A1 | 5/2003 | Damschroder |
| 2004/0172357 A1 | 9/2004 | Padgette |
| 2005/0278234 A1 | 12/2005 | Wagner et al. |
| 2006/0010065 A1 | 1/2006 | Howorka |
| 2006/0041491 A1 | 2/2006 | Smith et al. |
| 2006/0149674 A1 | 7/2006 | Cook et al. |
| 2006/0277134 A1 | 12/2006 | Glinberg et al. |
| 2006/0282380 A1 | 12/2006 | Birney et al. |
| 2007/0143179 A1 | 6/2007 | Eyal et al. |
| 2007/0294158 A1 | 12/2007 | Patel et al. |
| 2008/0288308 A1 | 11/2008 | Penney et al. |
| 2009/0119226 A1 | 5/2009 | Kurczek et al. |
| 2009/0187509 A1 | 7/2009 | Mcnamee et al. |
| 2009/0228318 A1 | 9/2009 | Ara et al. |
| 2009/0292635 A1 | 11/2009 | Sinclair et al. |
| 2010/0218115 A1 | 8/2010 | Curtin et al. |
| 2010/0223200 A1 | 9/2010 | Balson et al. |
| 2010/0250467 A1 | 9/2010 | Weinstein et al. |
| 2011/0016060 A1 | 1/2011 | Korzinin |
| 2012/0036086 A1* | 2/2012 | Caputo .................. G06Q 40/06 705/36 R |
| 2012/0047090 A1 | 2/2012 | Gunther |
| 2012/0123967 A1 | 5/2012 | Glinberg et al. |
| 2012/0317055 A1 | 12/2012 | Glinberg et al. |
| 2014/0067713 A1 | 3/2014 | Gerber |

OTHER PUBLICATIONS

Correlation and Dependence, Wikipedia—the free encyclopedia, accessed on Aug. 28, 2012 from http://en.wikipedia.org/wiki/Correlation.sub.-and.sub.--dependence, 8 pages.

Cukier et al., The Rise of Big Data, How It's Changing the Way We Think About the World, Foreign Affairs, May/Jun. 2013, pp. 28-40 (7 pages).

Hackman, Mean-Variance Portfolio Analysis and the Capital Asset Pricing Model, Course Notes, Georgia Institute of Technology, 2011, pp. 1-27.

International Search Report and Written Opinion corresponding to International Patent Application No. PCT/US2013/057521 dated Feb. 7, 2014, 20 pages.

Krawcheck, JPMorgan shows fighting complexity is futile, May 23, 2012, 3 pages.

Markowitz, Portfolio Selection, The Journal of Finance, 1952, pp. 77-91, vol. 7, No. 1.

Markowitz, Portfolio Selection: Efficient Diversification of Investment, Chapters 1, 2, and 8, pp. 3-35 and 154-187, Blackwell Publishers, 1991.

Penacchi, Chapter 2 Mean-Variance Analysis in Theory of Asset Pricing, 2008, pp. 37-89, Pearson/Addison-Wesley.

Ritholtz, JPMorgan's debacle and its parallels to AIG, The Washington Post, May 19, 2012, 3 pages.

Sommer, Before Leaping, Listen to a Giant, The New York Times, May 19, 2012, 3 pages.

* cited by examiner

SYSTEMS AND METHODS FOR MEASURING RELATIONSHIPS BETWEEN INVESTMENTS AND OTHER VARIABLES

CROSS-REFERENCE TO RELATED APPLICATIONS

This application is a continuation of U.S. patent application Ser. No. 15/948,962, entitled "SYSTEMS AND METHODS FOR MEASURING RELATIONSHIPS BETWEEN INVESTMENTS AND OTHER VARIABLES," filed Apr. 9, 2018, which is a continuation of U.S. patent application Ser. No. 14/015,257, entitled "SYSTEMS AND METHODS FOR MEASURING RELATIONSHIPS BETWEEN INVESTMENTS AND OTHER VARIABLES," filed Aug. 30, 2013, which claims priority to U.S. Provisional Patent Application Ser. No. 61/769,963, entitled "SYSTEMS AND METHODS FOR MEASURING RELATIONSHIPS BETWEEN INVESTMENTS AND OTHER VARIABLES," filed Feb. 27, 2013, which is incorporated by reference in its entirety.

U.S. patent application Ser. No. 14/015,257 is also a continuation-in-part of U.S. patent application Ser. No. 13/601,310, entitled "SYSTEMS AND METHODS FOR MANAGING INVESTMENTS," filed Aug. 31, 2012, which is incorporated by reference in its entirety.

U.S. patent application Ser. No. 14/015,257 is also a continuation-in-part of to U.S. patent application Ser. No. 13/601,386, entitled "SYSTEMS AND METHODS FOR MANAGING INVESTMENTS," filed Aug. 31, 2012, which is hereby incorporated by reference in its entirety.

FIELD OF THE INVENTION

This invention relates generally to systems and methods for measuring investments and other variables.

BACKGROUND

The primary objective of the investment management industry is to maximize returns while minimizing risk. The process of assimilating various investments into a portfolio that accomplishes this objective is one of the primary challenges for the industry. With the rise of sophisticated investment strategies and products, the portfolio construction process only becomes more difficult as managers perform analysis across a wider variety of asset classes, sectors and markets and attempt to quantify increasingly complex relationships. While conceptually sound techniques for optimal portfolio construction have existed for many years, the various assumptions underlying these techniques have not evolved with financial markets. Conventional tools and statistics used in modern portfolio construction suffer from flaws in both assumptions and application. The tools incorrectly assume that a single relational model (e.g., linear, curvilinear) or even multiple relational models can define the complex and dynamic relationships between financial variables. In addition, practitioners using conventional tools often prioritize statistical significance over economic significance. In doing so, practitioners prioritize the "fit" of a model over identifying potential relationships more important to profit and loss. As a result, the financial industry has struggled to construct portfolios with optimum levels of risk and return.

SUMMARY

In an attempt to better measure relationships between asset classes, sectors and markets, the systems and methods described herein establish a framework that can provide for portfolio construction with improved levels of risk and/or return. Analysts have conventionally relied on correlation models, but these statistics often fail to identify important relationships or place too much emphasis on trivial relationships. For example, a model based on correlation may be entirely insufficient when a long-term trend undergoes a sudden or even gradual change.

The systems and methods described herein enable optimal portfolio construction based on a new relationship model providing numerous improvements over conventional analysis, such as correlation. Further, the framework described herein allows for additional portfolio risk analysis based on this new relationship model. The systems and methods can identify previously hidden relationships between two or more variables, further characterize known relationships between variables or even reveal when there is no significant relationship between variables.

The systems and methods described herein have multiple applications in the field of finance and investment management. For example, the framework can identify previously unknown relationships between asset classes, sectors and markets. In some embodiments, the framework disclosed herein can be used to analyze relationships between asset classes in times of market stress, which are typically indicated by large price movements. For example, this framework can be used to identify meaningful relationships that arise when a market index moves more than a threshold amount (e.g., identifying which asset classes move more than five percent when a general equity index moves more than five percent). In some embodiments, the systems and methods described herein can enhance the application of mean-variance optimization in portfolio construction. Mean-variance portfolio optimization was developed by Professor Harry Markowitz of San Diego, Calif., and this method is widely used in the investment management industry for portfolio construction and management. The systems and methods described herein can produce covariance measures that better model comovement between financial variables, thereby improving mean-variance optimization. Furthermore, the systems and methods described herein provide more forward-looking and robust measures of expected return and risk, thereby better identifying true risk-adjusted returns. The framework described herein can also provide insight beyond the particular variables under analysis, often revealing external trends that may affect those variables (e.g., buy-side trends in the marketplace).

The systems and methods described herein have additional applications outside of finance and investment management. For example, the current framework can be applied to sport statistics, behavioral statistics, employment statistics, real estate statistics, or any other measurable objective data to identify relationships between variables. More generally, the systems and methods described herein can be used in any field in which two or more variables behave according to a relationship that cannot be fully represented by existing analytical tools.

Additional features and advantages of various embodiments will be set forth in the description which follows, and in part will be apparent from the description. Other advantages will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation.

BRIEF DESCRIPTION OF THE DRAWINGS

The preferred embodiments of the present invention are illustrated by way of example and not limited to the following figures.

DETAILED DESCRIPTION

Figure 1A:
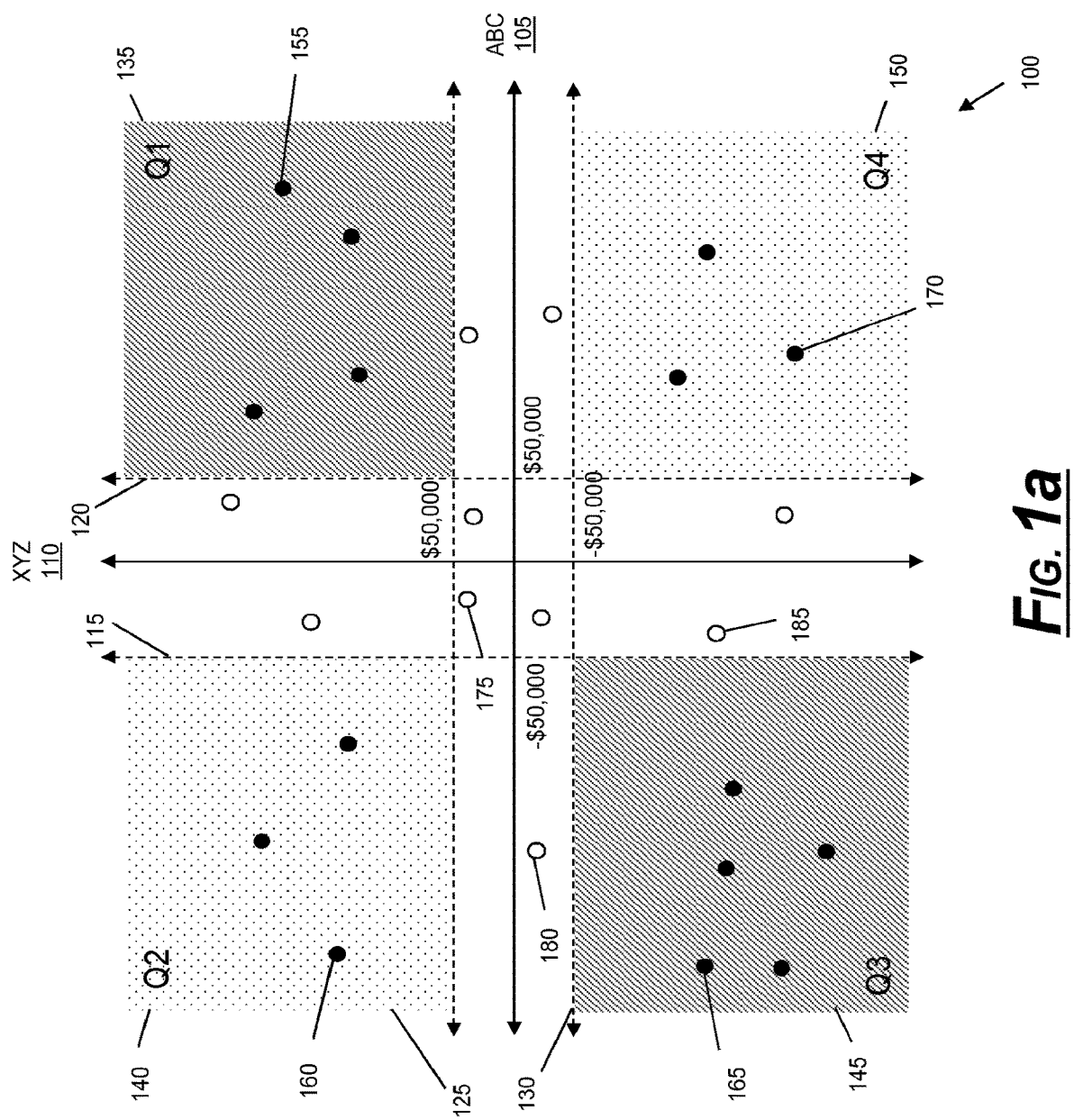
FIG. 1a depicts a comovement grid according to an exemplary embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

The embodiments described herein attempt to identify previously hidden relationships between two or more variables or further characterize known relationships between variables. This information has many applications in the field of finance and investment management. For example, information about the relationships between multiple variables (e.g., asset classes, sectors or markets) can be used as an input during portfolio construction, such as a measure of covariance across different variables. In another example, when managing multiple investments, it may be useful to analyze relationships between the investments to determine whether those investments are truly independent investments.

The current framework provides numerous advantages over known techniques for measuring relationships between variables. Such conventional techniques often rely on regression analysis, which can have several shortcomings. For example, regression analysis typically relies upon many data points to represent every movement of the variables, but many of these movements may be minor changes that do not provide any significant insight into the relationship between the two variables. In other words, regression analysis often incorporates "noise" by including too many inconsequential data points. As another example, regression analysis typically incorporates data points covering every movement over an extended period of time, but certain relationships, such as those in financial markets, can change drastically in relatively short periods of time. When such a change occurs, a large number of data points from the distant history may improperly weight the results and minimize the effect of a more recent, substantial movement. As another example, typical regression analysis can rely on $R^2$ calculations, which use a straight line fit, but relationships in the financial markets often do not follow straight line relationships.

Generally, the systems and methods described herein can measure the relationship between variables by determining when the values of the variables exceed a minimum value and change in the same or opposite directions. The relationship between variables, as described herein, is known as the "Gerber relationship." The Gerber relationship between two or more variables (e.g., asset classes, sectors, or markets) is an alternative measure of comovement between those variables. A Gerber relationship between variables can be a positive relation (e.g., both variables generally move in the same direction at the same time) or a negative relation (e.g., both variables generally move in opposite directions at the same time). A large positive relation may signify that the variables typically move in the same direction, while a large negative relation may signify that the variables typically move in opposite directions.

In contrast to conventional techniques, the systems and methods described herein can incorporate a threshold for filtering data points reflecting smaller variable movements that do not have any economic significance. In some embodiments, a threshold may be applied such that the Gerber relationship only considers data points reflecting a change greater than a predetermined magnitude. For example, when measuring the Gerber relationship between two asset classes, a threshold may be applied such that relatively minor changes in the value of either asset class can be filtered from the analysis. Any movement less than the threshold may be considered "noise," and filtering out those data points below the threshold may be desirable because they are likely to erroneously skew the analysis. After applying a threshold to filter out "noise," the remaining data points may be used to measure the Gerber relationship between the variables. Accordingly, the Gerber relationship can overcome the problem of data "noise" caused by conventional technique's over-inclusion of historical data in favor of more immediate, significant data about the variables.

In some embodiments, the systems and methods described herein may also apply a discretization process such that all data points exceeding the threshold are given equal weight. For example, when measuring the Gerber relationship between two asset classes, data points passing the threshold may be discretized such that a modest movement barely exceeding the threshold is given the same weight as a massive movement that exceeds the threshold ten-fold. Any massive movement might be conventionally considered an outlier, and therefore, its magnitude could have been considered to erroneously skew an analysis. However, the event of the massive movement may still be incorporated into this analysis because it has been discretized. In summary, measuring a Gerber relationship can include implementing a threshold to eliminate data "noise" and then discretizing the remaining observations to normalize any outliers while still incorporating these economically significant observations into the analysis.

Generally, the systems and methods described herein can calculate a statistic quantifying the Gerber relationship between variables. This statistic representing the Gerber relationship, as described herein, is known as the "Gerber statistic." In some embodiments, the Gerber statistic can be a positive or negative number reflecting the relative direction and strength of the relationship. Calculating the Gerber statistic may include counting the number of instances when values of both variables changed beyond a threshold and considering whether those changes were both in the same direction or in opposite directions. Instances when both variables move beyond the threshold and in the same direction (i.e., have a positive relation) are referred to herein as "positive unions," while instances when both variables move beyond the threshold and in opposite directions (i.e., have a negative relation) are referred to herein as "negative unions." Only periods in which both variables have movements beyond the threshold may be considered when calculating the Gerber statistic.

In some embodiments, a Gerber statistic can be a number between −100% and +100% that characterizes the Gerber relationship between a pair of variables. In one example of calculating a Gerber statistic, a threshold value can be set at $50,000 for a period of 10 days. During those 10 days, a first variable and a second variable may have movements in the same or opposite directions. Each time period in which the movements of both of these variables exceed the threshold value can be compared to determine the comovement of the variables. One exemplary method for calculating the Gerber statistic can include determining the number of positive unions minus the number of negative unions, all divided by a number of total unions. Alternatively, the Gerber statistic can be calculated by determining the number of positive unions minus a number of negative unions, all divided by the length of the period. The Gerber statistic is not intended to be limited to any particular formula, but can include any calculation of comovement where a threshold is applied to eliminate noise, and the remaining observations are compared for positive unions, negative unions, or both positive and negative unions.

In another example of calculating a Gerber statistic, there are 5 of the 10 days where the value of the first variable moved more than the threshold value. During those 5 days, the second variable only moved more than the threshold value 4 times. Therefore, the number of total unions is 4. During 3 of those 4 days, the first and second variables moved in the same direction (i.e., both positive or both negative), so the number of positive unions is 3. During the 1 remaining day from those 4 days, the first and second variables moved in the opposite directions (i.e., one positive and one negative), so the number of negative unions is 1. In this example, the Gerber statistic can be calculated as (3-1)/4, which is 50%. By implementing a threshold, any insignificant movements under the threshold value of $50,000 can be eliminated from the comparison. The remaining movements that exceed the threshold are discretized. If one movement was $300,000 and another movement was $70,000, these amounts are considered movements above the threshold value, but the magnitude above the threshold is not considered pertinent to the measure. Each movement above the threshold value is given equal weight, so a value conventionally considered an "outlier" would not skew these results.

In some embodiments, a Gerber statistic near −100% may indicate that the two variables have a high negative Gerber relationship. In other words, when the two variables both experience large movements, they typically move in opposite directions. On the other hand, a Gerber statistic close to 100% may indicate that the two variables have a high positive relation. In other words, when the two variables both experience large movements, they typically move in the same direction. Additionally, a Gerber statistic around 0% may indicate that the two variables do not have any movements beyond the threshold or a relatively equal number of positive and negative unions.

The systems and methods described herein can determine a Gerber relationship and calculate a Gerber statistic. Upon identifying variables, the systems and methods can retrieve the appropriate historical data to measure the Gerber relationship and calculate the Gerber statistic. As described herein, the systems and methods can comprise a computer program embodied on a computer-readable medium that can automatically perform the functions described herein, retrieve information to perform these functions, and display or output the results on a graphical user interface or provide the results to another system for further processing.

Referring to FIG. 1a, a comovement grid 100 is shown according to an exemplary embodiment. A first axis 105 represents movements of a first variable ABC, and a second axis 110 represents movements of a second variable XYZ. A threshold value for movement of either variable has been set at $50,000, which is depicted by threshold values 115, 120, 125, 130. These threshold values create four quadrants: quadrant 135 (Q1) representing both variables moving in a positive direction beyond the threshold, quadrant 140 (Q2) representing variable ABC moving in a negative direction beyond the threshold and variable XYZ moving in a positive direction beyond the threshold, quadrant 145 (Q3) representing both variable moving in a negative direction beyond the threshold, and quadrant 150 (Q4) representing variable ABC moving in a positive direction beyond the threshold and variable XYZ moving in a negative direction beyond the threshold. Quadrants 135, 145 represent the instances of a positive union, whereas quadrants 140, 150 represents the instances of a negative union.

In this exemplary embodiment, the grid uses daily measurements over a time period of 25 days. For each of those 25 days, a point is positioned on the grid 100 corresponding to the movements of the two variables ABC and XYZ. A point 155 represents a day that the two variables had a positive movement beyond the threshold, a point 160 represents a day that variable ABC has a negative movement beyond the threshold and variable XYZ has a positive movement beyond the threshold, a point 165 represents a day that the two variables have a negative movement beyond the threshold, and a point 170 represents a day that variable ABC has a positive movement beyond the threshold and variable XYZ has a negative movement beyond the threshold.

During the period of 25 days, one or both of the variables may experience a positive or negative daily movement that does not exceed the threshold value. For example, point 175 represents a day when variable ABC has a positive movement of less than $50,000, and variable XYZ has a negative movement of less than $50,000. Point 180 represents a day when variable ABC has a negative movement of more than $50,000 (exceeds the threshold), but variable XYZ has a negative movement of less than $50,000. Point 185 represents a day when variable ABC has a negative movement of less than $50,000, and variable XYZ has a negative movement of greater than $50,000 (exceeds the threshold). Because both variables do not have movements that exceed the threshold value on the days associated with points 175, 180, 185, these days are not utilized in determining the Gerber relationship.

The points 155, 160, 165, 170, and the other points in quadrants 135, 140, 145, 150, can be used to measure the Gerber relationship, because these points represent the instances where the movements exceeded a threshold and points below the threshold may be considered inconsequential. The threshold can assist in eliminating the noise, e.g., those instances where the movement is not significant enough to indicate a meaningful change during that period. The actual movement of a variable may be drastic, as shown in grid 100, but the magnitude of the movement is only applicable in determining whether it exceeds the threshold. For example, a positive movement of $60,000 is given the same weight as a positive movement of $800,000 when the threshold is set at $50,000.

While the embodiment shown in FIG. 1*a* relates to measuring movement in monetary value with a threshold specified in dollars, it is understood that any suitable measurement or unit can be used for movement and any suitable measurement or unit can be used as a threshold. For example, the movement measurement or a threshold can be absolute (e.g., a number of units) or relative (e.g., a percentage). In some embodiments, a threshold can be a relative measurement based on past behavior of the variable. The threshold can be based upon a standard deviation of past variable movement, whereby a lower standard deviation can represent a lower threshold more sensitive to variable movement. For example, a threshold may be set to a multiple of the variable's standard deviations based on past behavior. In some embodiments, a threshold may be dynamically adjusted for each measurement based on recent behavior of the variable. In such embodiments, the threshold may automatically change over time as the behavior of the variable evolves.

While the embodiment shown in FIG. 1*a* applies the same threshold value to both variables, it is understood that a different threshold can be applied to each variable. In some embodiments, each variable can have its own threshold based upon that particular variable's unique characteristics or past performance. For example, the threshold for each variable may be selected so that it corresponds to the movement magnitude, volatility, or other historical behavior of each variable. In one embodiment, a user can adjust the threshold for one or both variables, a feature that may be used to manually adjust for measurement sensitivity.

Figure 1B:
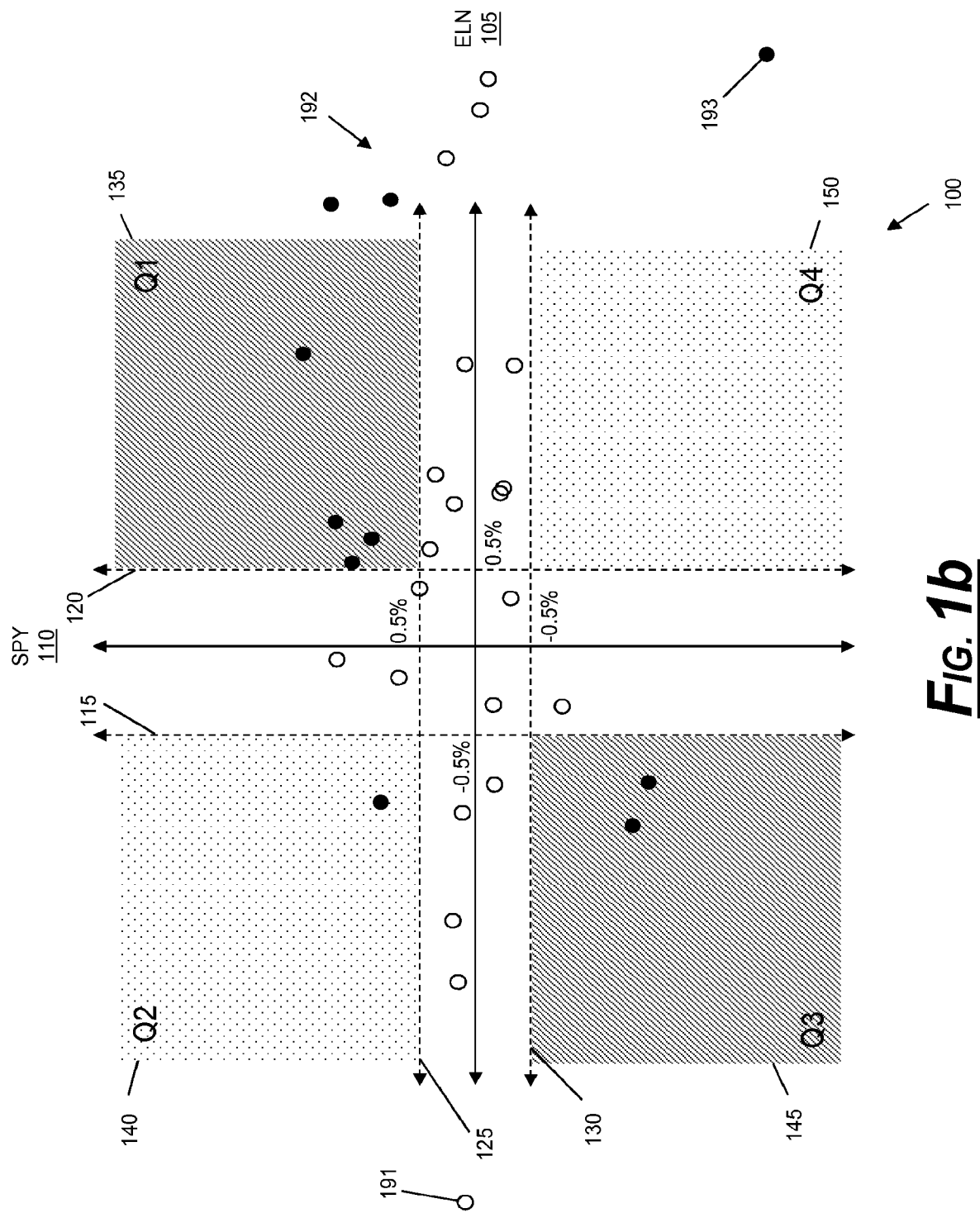
FIG. 1b depicts a comovement grid according to an exemplary embodiment.

Referring now to FIG. 1B, comovement grid 100 has been refreshed to represent a comparison between two exemplary variables: the stock of Elan Corporation (hereinafter "ELN") and the SPDR S&P 500 ETC Trust (hereinafter "SPY"). First axis 105 represents daily movements of ELN, and second axis 110 represents daily movements of SPY. In this particular example, a threshold value for movement of either variable has been set at 0.5%, which is depicted by threshold values 115, 120, 125, 130. In other words, the threshold is set to capture any daily movements greater than 0.5% of the relevant variable. These threshold values create four quadrants: quadrant 135 (Q1) representing both ELN and SPY moving in a positive direction beyond the relevant thresholds, quadrant 140 (Q2) representing ELN moving in a negative direction beyond the relevant threshold and SPY moving in a positive direction beyond the relevant threshold, quadrant 145 (Q3) representing both ELN and SPY moving in a negative direction beyond the relevant thresholds, and quadrant 150 (Q4) representing ELN moving in a positive direction beyond the relevant threshold and SPY moving in a negative direction beyond the relevant threshold. Quadrants 135, 145 represent the instances of a positive union, whereas quadrants 140, 150 represents the instances of a negative union.

In this exemplary embodiment, the grid uses daily measurements over a time period of 31 trading days from Jan. 28, 2013 to Mar. 12, 2013. For each of those 31 trading days, a point is positioned on the grid 100 corresponding to the movements of the two variables ELN and SPY. Because the grid shown in FIG. 1B has a limited scale, points 191, 192 and 193 each represent estimates for the corresponding trading days and may not be on the same scale as the rest of the grid. Only days on which both ELN and SPY moved beyond the relevant thresholds are used to determine the Gerber relationship between these two variables. Such days are represented on grid 100 by the filled black points, while the hollow black points represent days that are excluded from the calculation. As previously explained with regards to FIG. 1*a*, the thresholds can assist in eliminating noise because any points representing a day in which one of the variables moved less than the relevant threshold can be considered inconsequential.

The specific comparison shown in FIG. 1B reflects a situation in which traditional techniques, such as correlation analysis, may not provide adequate tools for measuring the relationship between variables. For example, analyzing the Gerber relationship between ELN and SPY reveals a significant number of positive unions and few negative unions but a traditional correlation analysis would indicate no relationship because the R Squared value is 0 over this same measurement period. Therefore, analyzing the Gerber relationship can reveal significant comovement between ELN and SPY that may not be apparent from a traditional correlation analysis.

While the embodiment shown in FIG. 1B relates to measuring movement in two variables representing publicly traded securities, it is understood that the same analysis can be applied to broader assets classes or groups of variables, such as deal code records described in parent U.S. patent application Ser. No. 13/601,310, entitled "SYSTEMS AND METHODS FOR MANAGING INVESTMENTS," filed Aug. 31, 2012 ("the '310 Application").

The comovement grid 100 represents one exemplary view of how a Gerber relationship can be measured. However, in one embodiment, the comovement grid 100 can be displayed on a graphical user interface to a user. When displaying the comovement grid 100, the user can adjust the sizes of the quadrants 135, 140, 145, 150 by sliding one or more lines associated with threshold values 115, 120, 125, 130 or inputting new threshold values for one or more of the threshold values 115, 120, 125, 130.

The comovement grid 100 represents one exemplary view of how a Gerber relationship can be measured. However, in one embodiment, the comovement grid 100 can be displayed on a graphical user interface to a user. When displaying the comovement grid 100, the user can adjust the sizes of the quadrants 135, 140, 145, 150 by sliding one or more lines associated with threshold values 115, 120, 125, 130 or inputting new threshold values for one or more of the threshold values 115, 120, 125, 130.

Figure 2:
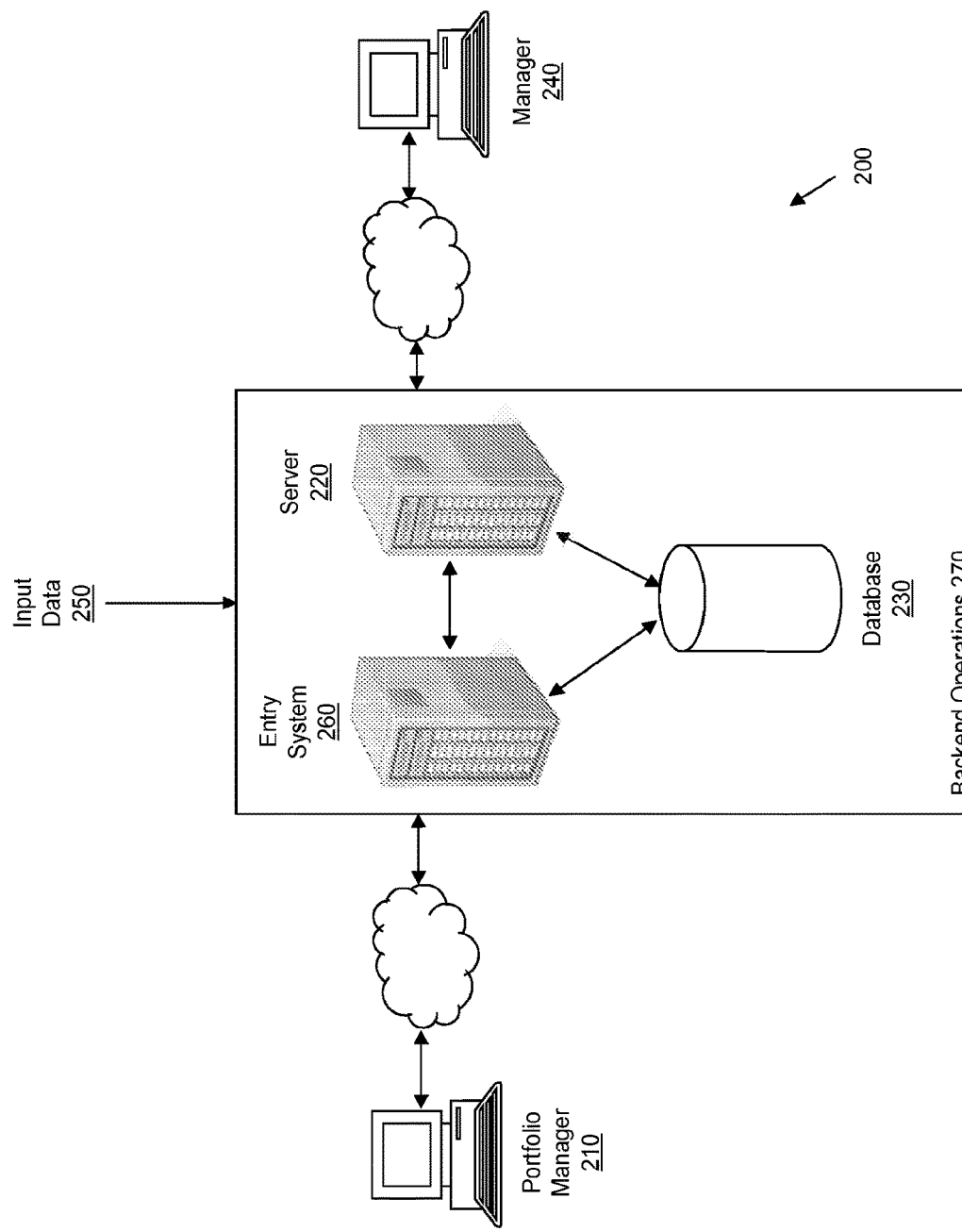
FIG. 2 depicts a system architecture according to an exemplary embodiment.

Referring now to FIG. 2, an exemplary architecture of a system 200 is shown. At least one user (e.g., a manager, a portfolio manager, trader, or analyst) can communicate with backend operations 270, including a server 220, over a network using a computer 210, such as a personal computer, desktop computer, laptop computer, personal data assistant (PDA), mobile device (e.g., a cellular phone), tablet computer, telephone, smart phone, or any other computing device. The network can be a local area network, wide area network, WI-FI network, or any other type of connection between the server 220 and the computer 210. Although the computer 210 is described as being used by the portfolio manager, it is intended that the label of a portfolio manager is not limited to an entity that has a supervisory role, but rather can include any entity, such as a trader, analyst, or investor, and each entity can have its own computer 210 for interaction with the system 200. The exemplary embodiments described herein use the terms investor, trader, manager, portfolio manager, analyst, and user, though it is intended that these functions and roles can be performed by or on behalf of any entity that instructs, uses, or implements the methods and systems described herein. In the exemplary embodiment, the portfolio manager can identify and propose new investments for purposes of portfolio construction.

The system 200 can also include a entry system 260, which can be a component of the server 220 or a separate, communicatively-coupled device, shown in the exemplary configuration in FIG. 2 as a separate server. The entry system 260 can allow the portfolio manager using computer 210 to submit input data regarding variables as well as inputs controlling backend operations 270. The entry system 260 can also be configured to automatically process input data regarding variables from input data 250. The entry system 260 can also communicate with the server 220 and any other components of the system 200.

At least one manager, such as a chief risk officer or a chief investment manager, can communicate with the server 220 over a network using a computer 240, such as a personal computer, desktop computer, laptop computer, personal data assistant (PDA), mobile device (e.g., a cellular phone), tablet computer, telephone, smart phone, or any other computing device. The network can be a local area network, wide area network, WI-FI network, or any other type of connection between the server 220 and the computer 240. In the exemplary embodiment, the manager can monitor asset allocation and evaluate risk of an investment strategy. The manager may reduce an allocation or impose a different portfolio construction based on an evaluation of diversification and risk.

The server 220 can transmit and receive information from the portfolio manager's computer 210 and the manager's computer 240, and can receive input data 250 from additional sources. Input data 250 can include any data about variables for purposes of measurement and analysis, and other related information. The input data 250 can be imported directly into the server 220, entry system 260 can transmit the input data 250 to the server 220, or computer 210 and computer 240 can transmit the input data 250 to the server 220. In some embodiments, the input data 250 can include real-time updates on stock prices, trade data from a data feed, historical data regarding one or more financial markets, dealer quotes, valuation services, models, good faith estimates or data from other financial data monitoring services.

The server 220 can store information in a database 230. The database 230 can be connected to the server 220 using a network, or alternatively, the server 220 and the database 230 can be integrated as a single computing device. It is also understood that the server 220 and the database 230 can each comprise multiple devices. The database 230 can manage (e.g., store, maintain, delete, search, and retrieve) records regarding variables, analysis regarding the variables, and other related information. In some embodiments, the database 230 can also include records regarding portfolio construction or asset allocation. The database 230 can store time-series data including, but not limited to, data points regarding variables and other external data. The time-series data in the database 230 can be for both current and historical data.

In the exemplary embodiment, a system can compare two or more ideas, concepts, projects, or strategies, which may be implemented into the system as variables. Examples of these ideas, concepts, projects, or strategies can include sport statistics, behavioral statistics, employment statistics, real estate statistics, or any other measurable objective data. In an exemplary embodiment, the systems and methods can be used to assess the relationship between financial indicators (e.g., asset classes, sectors, or markets) implemented into the system as variables. A financial indicator implemented into the system as a variable can be based on, but is not limited to, an asset class, sector, index, market, geographic area, note, corporate bond, municipal bond, stock, treasury stock, debenture, mutual funds, certificate of interest, certificate of deposit, derivative, commodity, currency, trust, put, call, straddle, option, investment in a partnership, investment in a limited liability corporation, fixed income security, equity or debt security, any other type of security or investment or any combination thereof.

Variable records may be stored in the database 230. Each record stored in the database 230 can include data points regarding the variable. The database 230 can store additional information in the record or associated with the record. The additional information can include, but is not limited to, variable type, present variable value, and comments. The database 230 can store variable data points collected during the history of a particular variable, so that a user, such as the portfolio manager or the manager, can query the database 230 to determine, in substantially real-time, the behavior of a variable since it was first entered into the system.

The portfolio manager via computer 210 and the manager via computer 240 can communicate with the server 220 to add, modify, delete, transfer, associate, and update variable records in the database 230. Input data 250 imported into the server 220 can also be used to update or otherwise modify the variable records in the database 230. The portfolio manager via computer 210 or the manager via computer 240 can search the database 230 for substantially real-time variable data points or for historical data. Additionally, the data can be aggregated based on any of the available fields for all date ranges. For example, the database 230 can aggregate all variable records based upon a particular criteria (e.g., all variable records relating to an asset class can be aggregated).

An exemplary process for measuring variables and the relationships between them can be characterized according to (1) a filtering stage, (2) an evaluation stage, and (3) a monitoring stage. It is intended that these stages are merely exemplary. The exemplary method is not limited to the order of steps or stages described, and steps or stages may be omitted in some embodiments.

Each of the stages of the system 200 can be implemented by a software module executed by a processor via one or more of the computer 210, server 220, computer 240, or a combination thereof. The first stage can be implemented in a filtering and collecting software module, the second stage can be implemented in an evaluative and performance statistics software module, and the third stage can be implemented in a monitoring software module. These modules can function together with the database 230 to provide data storage, evaluation, and monitoring of variables.

The storage of variable records in the database 230 allows for comparing multiple variables with each other. In this exemplary embodiment, calculation of a Gerber statistic may be performed, though it is understood that other types of statistical analysis may be performed in combination with calculation of a Gerber statistic.

Figure 3:
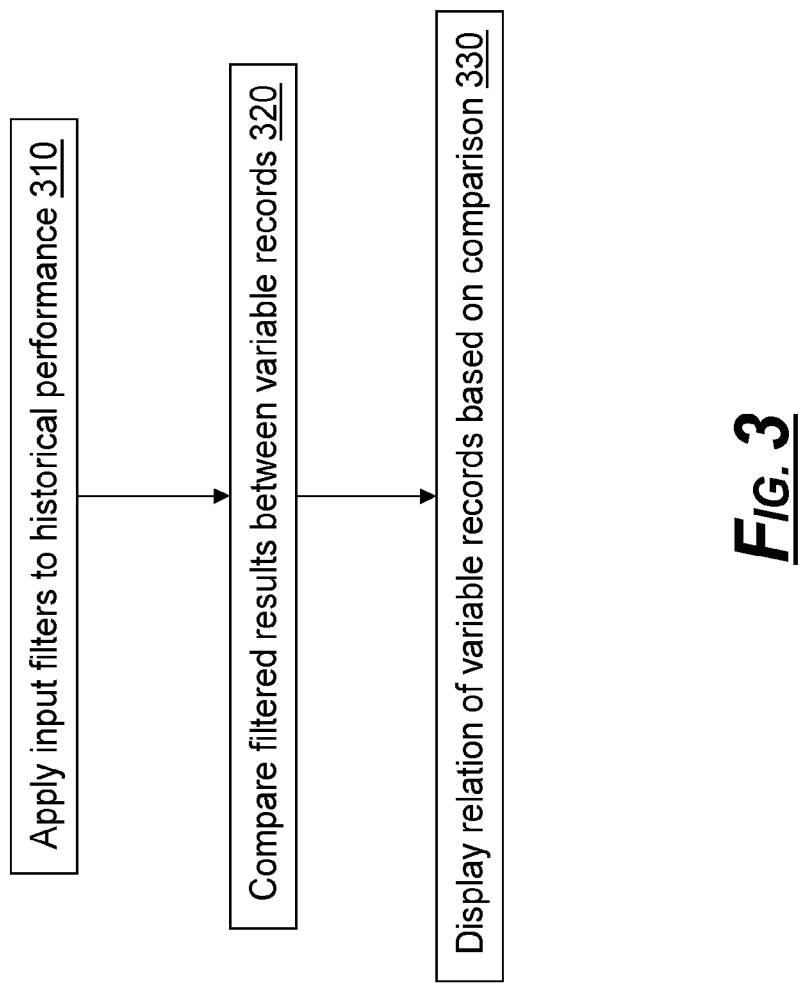
FIG. 3 depicts a method of comparing two variables according to an exemplary embodiment.

A Gerber statistic can be calculated based on the coordinated movements of multiple variables. Referring to FIG. 3, this analysis can be performed by data processing, in step 310. In one embodiment, an input filter may specify both the number of observation periods and a threshold value that the measured movement must exceed to be considered as a qualifying event. For example, the analysis may consider the instances over the last 25 days where both variables moved over $50,000 in the same day. For each of the variable records in the analysis, the system 200 can then compare the filtered results of each variable record to each of the other variable records, in step 320. The results, which may indicate the frequency of similar behavior, can be used to determine the uniqueness, with regard to performance, of each variable when compared to the other individual variables in the analysis. The analysis of step 330 can be performed by computer 210, computer 240, server 220, or any combination thereof. The results can be displayed, in step 330. For example, computer 210 or computer 240 can present the comparison of variables.

In some situations, groups of variables may exhibit related performance over time. For example, a collection of variables associated with one characteristic (e.g., various investments associated with the same asset class) may exhibit a pattern of performance when compared to a collection of variables associated with a second characteristic (e.g., investments associated with a different asset class). Accordingly, the systems and methods described herein can measure the Gerber relationships between a first group of variables and a second group of variables.

The system 200 can present information for display on computer 210 for the portfolio manager or computer 240 for the manager regarding data points associated with a variable record in the database 230. The portfolio manager or the manager can query the system 200 to analyze the Gerber relationship between two or more variables, and the system 200 can output this information for each variable.

Based on the Gerber relationships between variables, the system can display on a user interface the extent of a relationship between two or more variables. The relationship can be depicted in a format whereby variables moving in the same direction and having a positive relation may be depicted differently (e.g., different size, color, or shape) than those variables moving in a different direction and having a negative relation. In one example, the user interface can present a treemapping of Gerber statistic values, whereby the size of a nested rectangle can be indicative of the extent of a Gerber relationship between two variables, whereby variables represented by larger rectangles are more related to other variables than those variables represented by smaller rectangles. In one alternative, the treemapping of variable relationships can include only those variables having a positive relation or can perform filtering based on other criteria. In another example, the analysis can be presented in a cartographic generalization, whereby a geographic map is generated based on the relationships and elevation can represent an extent of a relationship. In yet another example, the analysis can be presented in a multi-layer Venn diagram, whereby overlapping sections can represent the extent of a relationship between variables. It is intended that any representation can be displayed, including the use of pictures, symbols, colors, and words, to show an extent of relationship between variables.

In some embodiments, the Gerber relationship between variables (e.g., investments, assets classes, sectors, and markets) can be used to evaluate the comovement of the variables. A diversity score can be calculated that represents an extent of comovement between two or more variables. For example, points can be allocated to represent the direction and extent of a Gerber relationship between two or more variables to generate a diversity score. Each variable can be allocated with a point for each instance where the variable has a negative Gerber statistic (i.e., generally moves in opposite directions) with respect to another variable. Variables can also be allocated with fractional points for those negative relations that occur less than a hundred percent of the time (e.g., for a relation of −20%, a 0.2 can be awarded). Likewise, a negative point or fraction thereof can be applied each time a variable has a positive relation (i.e., generally moves in the same direction) with respect to another variable. The total points for a variable can be considered a diversity score, whereby a higher diversity score is more favorable for some variables (e.g., investments).

The Gerber relationship can be used in the context of portfolio construction. In constructing a portfolio, an investor determines how to allocate capital between various assets (e.g., equities, fixed income securities, cash, real estate, currency, alternatives, commodities, collectibles, and derivatives) based upon risk tolerance or minimum rate of return. A portfolio with a high diversification of assets can subject the investor to lower risk, and the Gerber relationship can be used to measure the diversification of a portfolio.

An established method for portfolio construction according to mean-variance optimization involves analyzing the risk of potential investments using expected return, expected variance, and expected covariance. This method is described in further detail in "Portfolio Selection" and "Portfolio Selection: Efficient Diversification of Investments," incorporated herein by reference in their entirety. The portfolio can then be optimized based on risk tolerance or return requirements. When applying this method, the Gerber relationship can be used in place of correlation to provide a more accurate measure of expected covariance than the conventional measure of expected covariance.

In allocating capital among various assets with different levels of risk, an investor might focus on achieving the best possible rate of return for the portfolio without exceeding a volatility limit, which is affected by the diversification of the individual assets in the portfolio. In other words, the investor typically desires the best possible return for a given risk level. In some scenarios, an investor may seek the minimum amount of risk based on a given return target. The risk of a portfolio's return is related to the variance of its return, and so a goal of portfolio construction is to create a portfolio with a high return and a minimized variance. But the variance of a portfolio also depends on the covariances between the individual investments. Accordingly, optimal portfolio construction accounts for the comovement of investments.

Conventional portfolio construction methods attempt to determine a risk-adjusted return of a portfolio of investments using each investment's expected return and covariance with the other investments in the portfolio. Traditionally, covariance of two investments is based on correlation and may be calculated as follows:

$$\text{Cov}(R_X, R_Y) = \sigma_X \sigma_Y \rho_{XY}$$

Where $R_X$ denotes a return of the first investment, $R_Y$ denotes a return of the second investment, $\sigma_X$ denotes a standard deviation of the return of the first investment, $\sigma_Y$ denotes a standard deviation of the return of the second investment, and $\rho_{XY}$ denotes a correlation value between the first and second investments. A correlation value must always be a number between −1 and 1, whereby a correlation of 1 indicates that the investments move perfectly together, a correlation of 0 indicates that the investments move in random directions from each other, and a correlation of −1 indicates that the investments move perfectly in opposite directions. Conventional methods use this covariance formula to calculate the standard deviation of the returns from a multi-investment portfolio, whereby the standard deviation may represent an indicator of risk for the portfolio.

Gerber relationships can be used to calculate covariance of investments instead of the conventional methods that rely on correlation. In some embodiments, Gerber relationships can be used to calculate a covariance matrix comparing each possible pair of investments in a portfolio. A Gerber statistic can provide a comovement measure in the same units and range as a conventional correlation calculation (e.g., a number between −1 and 1). As a result, the Gerber statistic can easily replace the conventional correlation measurement when calculating the covariance of a portfolio. Using the Gerber statistic as a replacement for correlation, the same expected variances may be used to calculate covariances, which can then be used with the same expected returns to identify a mean-variance optimal allocation for each investment in the portfolio. The resulting portfolio construction or optimization will produce improved results because of the previously discussed advantages that measuring the Gerber statistic has over conventional correlation.

An investor can use a computer system, such as system 200, to calculate the expected return of a proposed portfolio or an existing portfolio. The investor can input the portfolio's investments into the system, which can access historical data about the investments and calculate the necessary Gerber statistics. The computer system can assess the Gerber statistics and display a figure, number, scale, or other graphic to the investor about the risk in the investments. Based upon an input of a capital amount to invest, the systems can determine how to allocate the capital based upon the investor's acceptable level of risk or target returns. For example, when attempting to maximize returns of a portfolio for a given level of risk, the computer system can vary the weightings of different investments to find the best possible expected returns without exceeding the given level of risk. The system may then allocate capital based upon the weighting of those investments to maintain the appropriate risk-reward levels. In one embodiment, the investor can adjust a level of acceptable risk, and the computer system can suggest a new weighting of the investments to maximize returns for that risk level. Upon a confirmation by the investor, the system can automatically allocate the capital accordingly.

Figure 4:
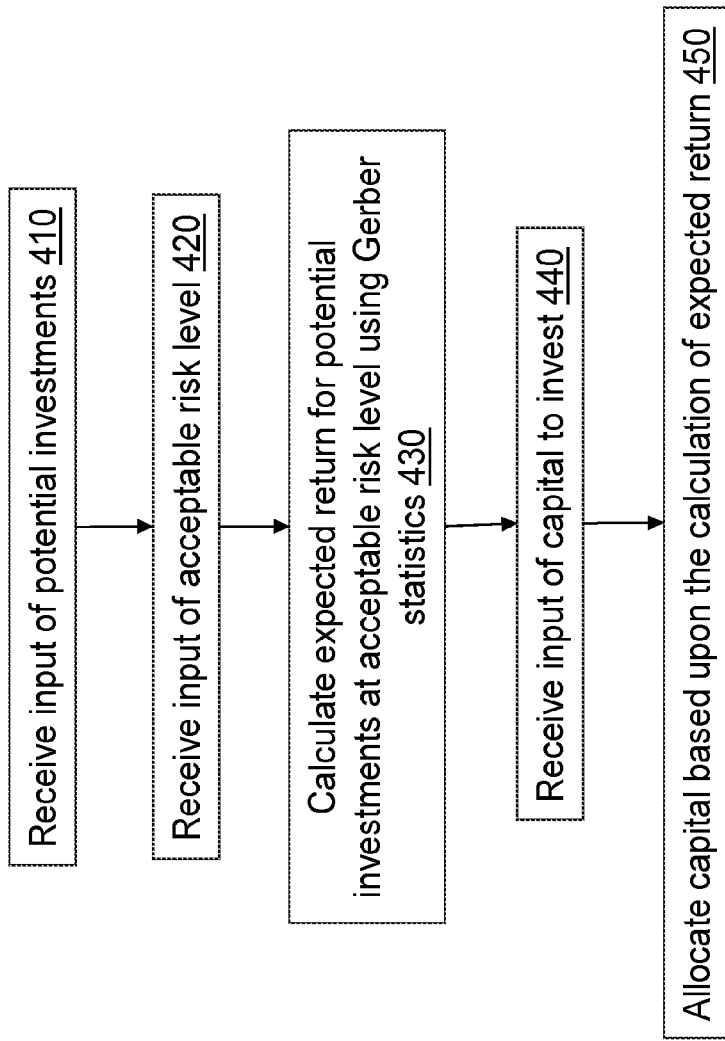
FIG. 4 depicts a method of portfolio construction according to an exemplary embodiment.

In an exemplary method of portfolio construction, as shown in FIG. 4, a computer system (e.g., system 200 shown in FIG. 2) can receive an input of potential investments from a user or another computer, in step 410. The input can include an identification of different asset classes, sectors, markets, investment strategies, or particular investments. The system can also receive an acceptable level of risk, in step 420. The acceptable level of risk can be determined by the user, or the system may use a default level. Based upon the identified investments and the level of risk, the computer system can calculate an expected return for the potential investments using Gerber statistics, in step 430. The system can calculate various weightings of the investments to determine how to allocate capital between these investments to achieve the maximum level of return while satisfying the acceptable rate of risk. The computer system can then receive an input of an amount of capital, in step 440. The system can allocate the capital to the inputted investments based upon the calculations, in step 450.

Figure 5:
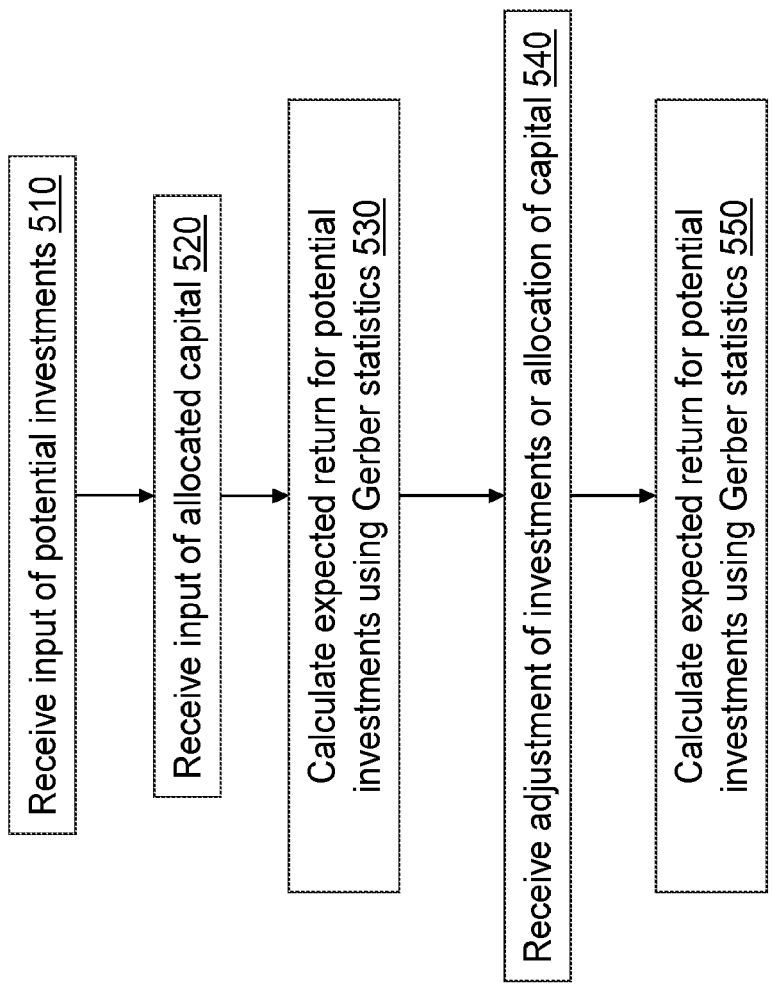
FIG. 5 depicts a method of portfolio construction according to an exemplary embodiment.

In an alternative embodiment, as shown in FIG. 5, a computer system (e.g., system 200 shown in FIG. 2) can determine the risk of a proposed or existing portfolio based upon inputs. The system can receive an input of investments, in step 510. The computer system can also receive an amount of capital for each investment, in step 520. The system can then calculate an expected return for the investments using Gerber statistics, in step 530. Optionally, a user can adjust the investments or an allocation of capital to the investments, in step 540. In response, the computer system can re-calculate the expected return using the Gerber relationship, in step 550.

In one embodiment, a computer-implemented method for portfolio construction comprises calculating, by a computer, a risk of at least two investments using a Gerber statistic for a first investment of the at least two investments in relation to a second investment of the at least two investments; and determining, by a computer, an allocation of assets based upon the calculated risk.

In another embodiment, a computer-implemented method for portfolio construction comprises receiving, by a computer, performance data for at least two investments; receiving, by the computer, an input of a level of risk; calculating, by the computer, an expected return for potential investments at the level of risk based on Gerber statistics related to the at least two investments; receiving, by the computer, an amount of capital to invest; and allocating, by computer, the capital based upon the calculated expected return.

In yet another embodiment, a computer-implemented method for portfolio construction comprises receiving, by a computer, performance data for at least two investments; receiving, by the computer, an amount of capital to allocate to the at least two investments; and calculating, by the computer, an expected return for the at least two investments using Gerber statistics.

The systems and methods described herein are related to those described in the '310 Application, which has been incorporated by reference in its entirety. For example, the use of deal code records to monitor investments as taught in the '310 Application is another implementation of the current framework for measuring relationships between variables. In the context of the systems and methods of the '310 Application, each deal code record can be considered a variable and the investment monitoring system can measures the relationships between those variables.

In one embodiment, a computer-implemented method of evaluating an investment comprises receiving, by a computer, historical performance data that represents profit and loss for a first investment and profit and loss for a second investment; determining, by a computer, how many instances in the historical performance data the profit and loss of both of the first and second investments exceed a threshold value; for each instance in which the profit and loss of both the first and second investments exceeds the threshold value, determining, by a computer, whether the first and second investments have a positive union or a negative union; and calculating, by a computer, a statistic representing a relationship between the first and second investments based upon the number of positive unions and the number of negative unions.

In another embodiment, a computer-implemented method of assessing a relationship between two variables comprises receiving, using a computer, historical data that represents performance of a first variable and performance of a second variable; determining, using a computer, how many instances in the historical data the performance of both the first and second variables exceed the threshold value; for each instance in which the performance of both the first and second variables exceeds the threshold value, determining, using a computer, whether the first and second variables have a positive union or a negative union; and calculating, using a computer, a statistic representing an observed relationship between the first and second variables based upon the number of positive unions and the number of negative unions.

In yet another embodiment, a computer program product, comprising a tangible computer readable medium having a computer readable program code embodied therein, the computer readable program code adapted to be executed to implement a method for evaluating an investment, the method comprises providing a system, wherein the system comprises distinct software modules, and wherein the distinct software modules comprise a construction module, a first module, a second module, and a third module; receiving, using the first module, historical performance data that represents profit and loss for a first investment and profit and loss for a second investment; determining, using the second module, how many instances in the historical performance data the profit and loss of both of the first and second investments exceed a threshold value; for each instance in which the profit and loss of both the first and second investments exceeds the threshold value, determining, using the third module, whether the first and second investments have a positive union or a negative union; and calculating, using the fourth module, a statistic representing a relationship between the first and second investments based upon the number of positive unions and the number of negative unions.

Unless specifically stated otherwise as apparent from the following discussion, it is appreciated that throughout the description, discussions utilizing terms such as "creating," "executing," "providing," "calculating," "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers or memories into other data similarly represented as physical quantities within the system's memories or registers or other such information storage, transmission or display devices. The system can be installed on a mobile device.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but not limited to, any type of disk including floppy disks, optical disks, CD-ROMs and magnetic-optical disks, read only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known non-transitory devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to the disclosure.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components can be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms "determine," "calculate" and "compute," and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A method comprising:
   retrieving, by a server, performance data for a plurality of data records;
   determining, by the server for each data record of the plurality of data records, how many instances a value of the performance data is above an upper threshold or below a lower threshold;
   for at least one pair of data records within the plurality of data records, determining, by the server, whether a first data record of a pair of data records and a second data record of the pair of data records have a positive union or a negative union based on each instance in which the respective value of the performance data is above the upper threshold or below the lower threshold for both the first data record and the second data record;
   displaying, by the server for the at least one pair of data records, a visual indicator on a graphical user interface having at least four regions,
      wherein a first region represents positive union with respect to both thresholds, a second region represents negative union with respect to both thresholds, a third region represents positive union with respect to the lower threshold and negative union with respect to the upper threshold, and a fourth region represents negative union with respect to the lower threshold and positive union with respect to the upper threshold, and
      wherein a location of the visual indicator corresponds to a relationship between the first data record and the second data record based on the a number of positive unions and a number of negative unions.

2. The method according to claim 1, wherein calculating the relationship further comprises:
   determining, by the server, a first value based upon the number of positive unions;
   determining, by the server, a second value based upon the number of negative unions;
   determining, by the server, a third value based upon the number of instances in which the changes in values of the performance data for both the first data record and the second data record is above the upper threshold or below the lower threshold; and
   calculating, by the server, the relationship based upon the first value minus the second value, then divided by the third value.

3. The method according to claim 1, wherein each instance corresponds to a predetermined amount of time.

4. The method according to claim 1, wherein the server receives the upper threshold and the lower threshold from an electronic device displaying the graphical user interface.

5. The method according to claim 1, further comprising:
   calculating, by the server, mean-variance optimized portfolio construction wherein covariance is based on the relationship.

6. The method according to claim 1, wherein the visual indicator uses a color to depict an extent of the relationship.

7. The method according to claim 6, wherein a first color represents a first co-movement between the first data record and the second data record that satisfies a co-movement threshold, and a second color represents a second co-movement between the first data record and the second data record that satisfies a second co-movement threshold.

8. The method according to claim 1, wherein the visual indicator uses a symbol to depict an extent of the relationship.

9. The method according to claim 8, wherein a first symbol represents a first co-movement between the first data record and the second data record that satisfies a co-movement threshold, and a second symbol represents a second co-movement between the first data record and the second data record that satisfies a second co-movement threshold.

10. The method according to claim 1, wherein the four regions are visually separated in accordance with the upper threshold and the lower threshold.

11. A computer system comprising:
   a processor and a non-transitory computer-readable medium containing instructions that when executed by the processor cause the processor to perform operations comprising:
     retrieving performance data for a plurality of data records;
     determining, for each data record of the plurality of data records, how many instances a value of the performance data is above an upper threshold or below a lower threshold;
     for at least one pair of data records within the plurality of data records, determining whether a first data record of a pair of data records and a second data record of the pair of data records have a positive union or a negative union based on each instance in which the respective value of the performance data is above the upper threshold or below the lower threshold for both the first data record and the second data record;
     displaying, for the at least one pair of data records, a visual indicator on a graphical user interface having at least four regions, wherein a first region represents positive union with respect to both thresholds, a second region represents negative union with respect to both thresholds, a third region represents positive union with respect to the lower threshold and negative union with respect to the upper threshold, and a fourth region represents negative union with respect to the lower threshold and positive union with respect to the upper threshold, and wherein a location of the visual indicator corresponds to a relationship between the first data record and the second data record based on the a number of positive unions and a number of negative unions.

12. The system according to claim 11, wherein calculating the relationship further comprises:
   determining a first value based upon the number of positive unions;
   determining a second value based upon the number of negative unions;
   determining a third value based upon the number of instances in which the changes in values of the performance data for both the first data record and the second data record is above the upper threshold or below the lower threshold; and
   calculating the relationship based upon the first value minus the second value, then divided by the third value.

13. The system according to claim 11, wherein each instance corresponds to a predetermined amount of time.

14. The system according to claim 11, wherein the server receives the upper threshold and the lower threshold from an electronic device displaying the graphical user interface.

15. The system according to claim 11, the instructions further cause the processor to:
   calculate mean-variance optimized portfolio construction wherein covariance is based on the relationship.

16. The system according to claim 11, wherein the visual indicator uses a color to depict an extent of the relationship.

17. The system according to claim 16, wherein a first color represents a first co-movement between the first data record and the second data record that satisfies a co-movement threshold, and a second color represents a second co-movement between the first data record and the second data record that satisfies a second co-movement threshold.

18. The system according to claim 11, wherein the visual indicator uses a symbol to depict an extent of the relationship.

19. The system according to claim 18, wherein a first symbol represents a first co-movement between the first data record and the second data record that satisfies a co-movement threshold, and a second symbol represents a second co-movement between the first data record and the second data record that satisfies a second co-movement threshold.

20. The system according to claim 11, wherein the four regions are visually separated in accordance with the upper threshold and the lower threshold.

* * * * *